United States Patent
Takahashi et al.

[15] 3,678,361
[45] July 18, 1972

[54] STARTING CONTROL FOR AN A.C. ELECTRIC MOTOR DEVICE

[72] Inventors: Hideomi Takahashi, Tokyo; Katsuhiko Takigami, Kawasaki, both of Japan

[73] Assignee: Tokyo Shibaura Electric Co., Ltd., Kawasaki, Kanagawa-ken, Japan

[22] Filed: July 23, 1971

[21] Appl. No.: 165,559

[30] Foreign Application Priority Data

July 25, 1970 Japan.....................................45/64798

[52] U.S. Cl. ...........................318/473, 318/221, 317/13 R
[51] Int. Cl. ......................................................H02h 7/09
[58] Field of Search..............318/473, 221 E, 227; 317/13 R

[56] References Cited

UNITED STATES PATENTS

| | | | |
|---|---|---|---|
| 3,538,411 | 11/1970 | Knauer et al.................. | 318/221 E |
| 3,562,587 | 2/1971 | Forst............................... | 317/13 |
| 3,569,781 | 3/1971 | Strachan........................ | 318/473 X |
| 3,582,740 | 6/1971 | Reinert.......................... | 317/13 R |

*Primary Examiner*—Benjamin Dobeck
*Attorney*—Norman F. Oblon et al.

[57] ABSTRACT

An electric motor is connected to an A. C. voltage supply through a thyristor switching device and is started by the full voltage starting method. In order to prevent the thyristors in the thyristor switching device from a burn-out due to an excessive starting current, the thyristor switching device is controlled to be intermittently turned off during the starting period of the motor under the control of a thyristor temperature rise anticipation circuit. The thyristor switching device is also controlled to be intermittently turned on during the starting period under the control of a thyristor temperature fall anticipation circuit and a synchronous indicating circuit.

4 Claims, 2 Drawing Figures

STARTING CONTROL FOR AN A.C. ELECTRIC MOTOR DEVICE

BACKGROUND OF THE INVENTION

1. Field Of The Invention

The present invention relates to a starting control for an A.C. electric motor in which a thyristor switching device is employed for connecting and disconnecting the motor to an A.C. voltage supply.

2. Description Of The Prior Art

Recently, a static switch or thyristor switching device has been employed as a switch for an A.C. electric motor since the same has been found to be quite successful in achieving an arcless, noiseless and chatterless opening and closing of an electric power circuit. While somewhat satisfactory, some difficulties have arisen in the thyristor switching device when it has been employed with an A.C. electric motor device. Thus, for example, when the electric motor was of an induction starting type such as an induction motor or a synchronous induction motor, and the same was started by a full voltage starting method, an extremely large starting current having an amplitude exceeding six to 15 times that of the rate current would often rush into the motor for a period of from several seconds to a minute.

Such a rush of current to the motor would often result in a burnout of the thyristors unless the same were made of a large enough size to sufficiently resist against the heavier load current flowing therethrough. However, since the amplitude of the rated current of the motor is generally small relative to that of the starting current, the provision of large scale thyristors was found to be quite expensive.

SUMMARY OF THE INVENTION

Accordingly, it is an object of the present invention to provide a new and improved unique starting control for an A.C. electric motor in which thyristors having a relatively small capacity and size can be employed in a thyristor switching device for the motor.

Another object of the present invention is to provide a new and improved unique starting control for an A.C. motor device in which a thyristor switching device is intermittently turned off during the starting of the motor by the anticipation of a predetermined temperature rise of the thyristors in response to an excess starting current flowing through the motor.

Still another object of the subject invention is to provide a new and improved unique starting control for an A.C. electric motor device in which a thyristor switching device is intermittently turned on during the starting of the motor by the anticipation of a predetermined temperature fall of the thyristors in response to the turn-off of the thyristors.

Yet still a further object of the present invention is to provide a new and improved unique starting control for an A.C. motor device in which a thyristor switching device is intermittently turned on during the starting of the motor under the control of a thyristor temperature fall anticipation circuit and a synchronous indicating circuit which detects a sychronization between the voltages across the thyristor switching device when the thyristors therein are turned off.

Briefly, in accordance with the present invention, the foregoing and other objects are in one aspect attained by the provision of a thyristor switching device which is connected between an A.C. electric motor and an A.C. voltage supply for connecting and disconnecting the motor from the A.C. voltage supply. A thyristor temperature rise anticipation circuit is provided for intermittently turning off the thyristor switching device by anticipating a predetermined temperature rise of the thyristors in the thyristor switching device in response to an excessive motor starting current during the starting of the motor. A thyristor temperature fall anticipation circuit is provided for intermittently turning on the thyristor switching device during the starting of the motor by anticipating a predetermined temperature fall of the thyristors in the thyristor switching device in response to a turn-off of the thyristor switching device. A synchronous indicating circuit is also provided for detecting a synchronization between the voltages across the thyristor switching device while the same is turned off, and for then enabling the thyristor switching device to turn on in cooperation with the thyristor temperature fall anticipation circuit.

BRIEF DESCRIPTION OF THE DRAWINGS

A more complete appreciation of this invention will be readily obtained as the same becomes understood when considered in connection with the accompanying drawings, wherein.

DETAILED DESCRIPTION OF THE PREFERRED EMBODIMENTS

Figure 1:
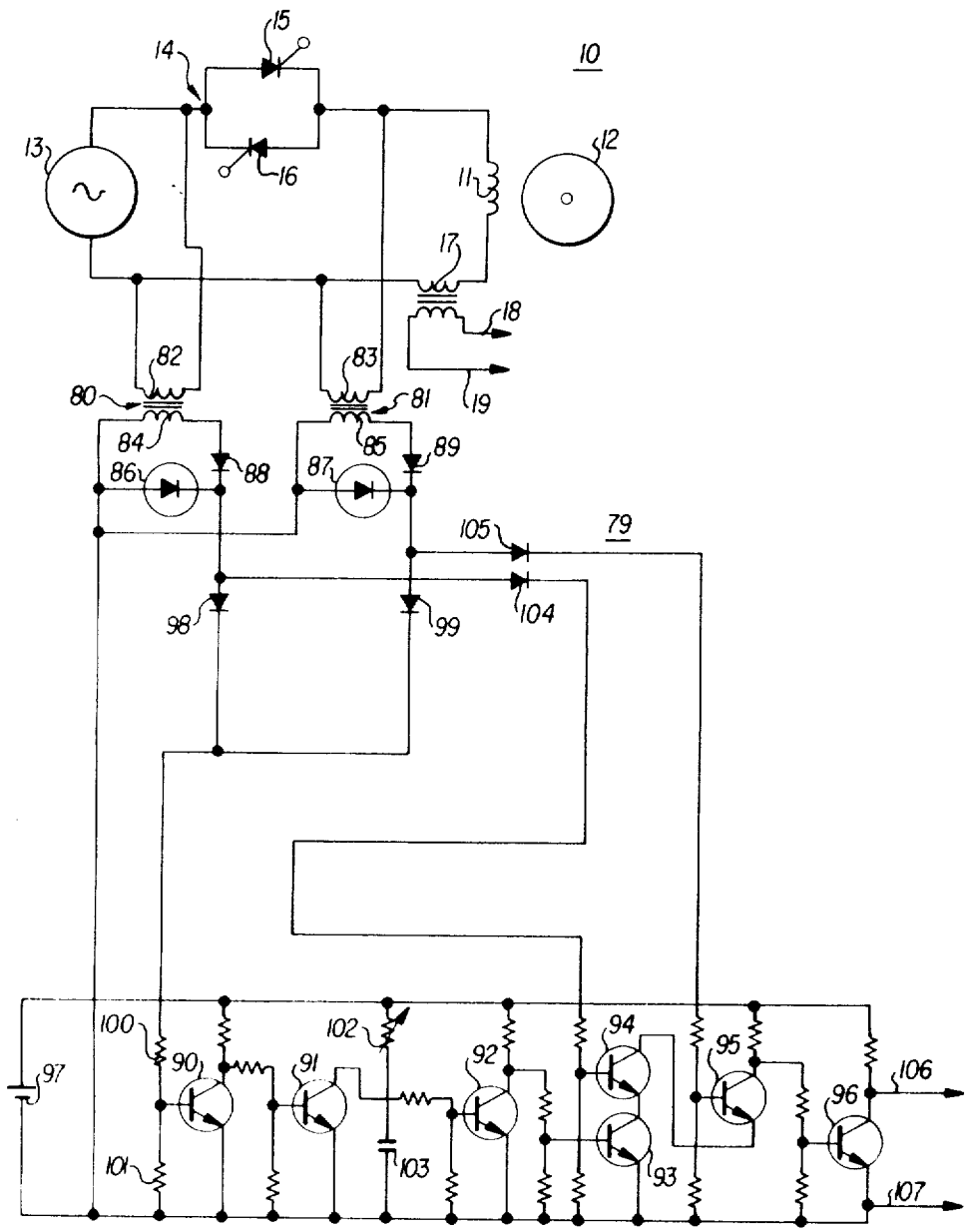
FIGS. 1 and 2 show a circuit diagram of a starting control for an A.C. electric motor in accordance with one preferred embodiment of the present invention.
Figure 2:
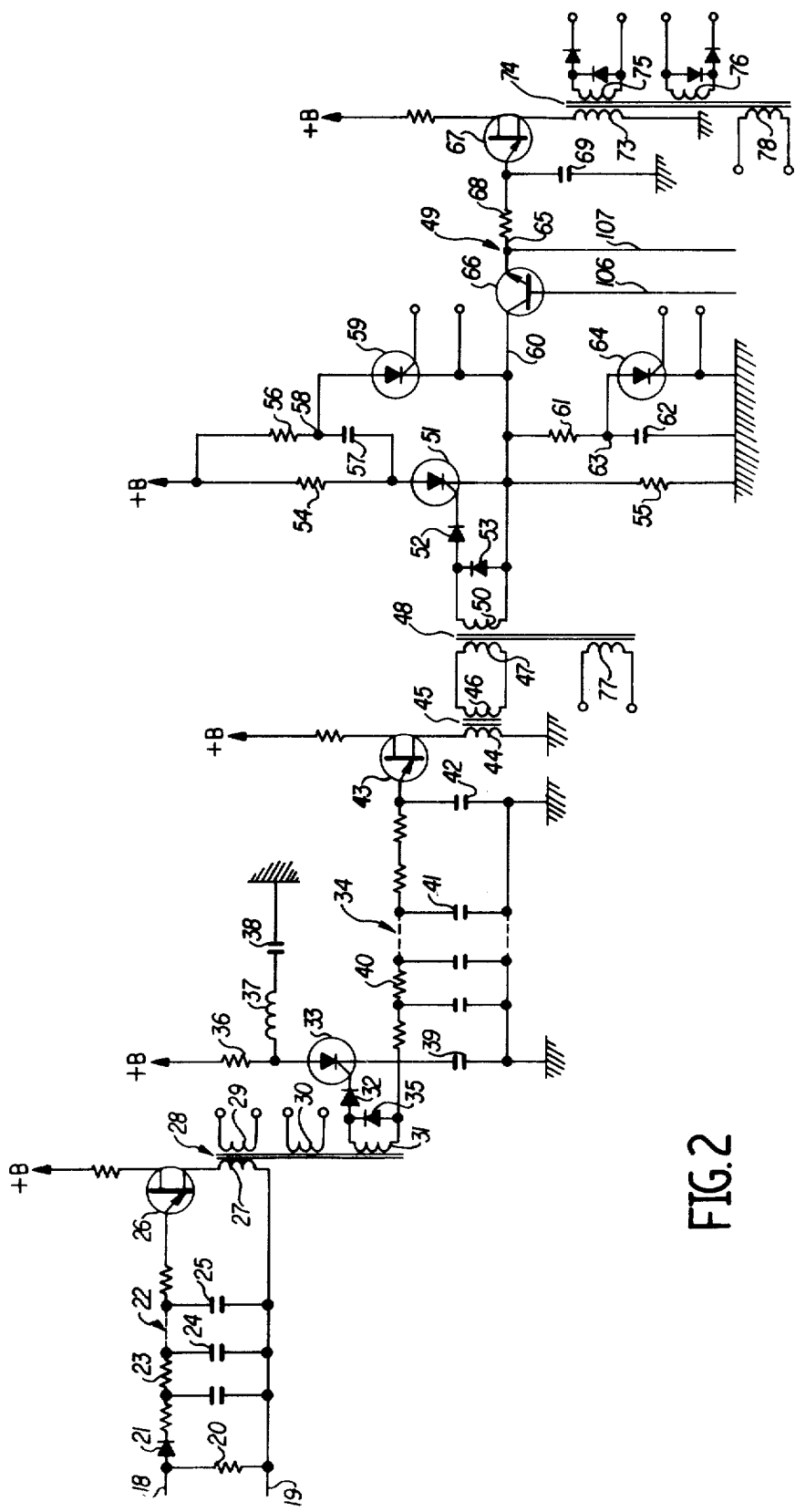

Referring now to FIGS. 1 and 2, an induction motor 10 is therein shown as having a stator winding 11 and a rotor 12. The stator winding 11 is connected for energization thereof to an A.C. voltage supply 13 through a thyristor switching device 14 which has a pair of thyristors 15 and 16 connected in parallel with oppositely conductive polarities.

For convenience of illustration, the induction motor 10 is shown as being of a single phase type, however, in an actual system the same would be of three-phase type, and the thyristor switching device 14 would be provided in each of the respective phase lines of the motor. Furthermore, it should be understood by way of example that the electric motor 10 may be of the synchronous induction motor type. In addition, in accordance with the present invention, a plurality of motors could be connected through a set of thyristor switching devices to an A.C. voltage supply 13.

A current, which corresponds to the current flowing through stator winding 11 of the motor 10, is taken out by a current transformer 17, and is passed through conductors 18 and 19 to a load 20 of FIG. 2 where the same is converted into a voltage drop in response to the input current of the motor 10.

The voltage drop across the load 20 is rectified through a diode 21, and is then applied to a thyristor temperature rise anticipation circuit 22. The thyristor temperature rise anticipation circuit 22 includes a conventional integrating circuit which has a plurality of resistance elements 22 and capacitance elements 24 connected as shown. The output of the integrating circuit is then applied to a capacitor 25 for charging of the same. The voltage across capacitor 24 is then applied to an emitter electrode of a unijunction transistor 26. One base electrode of the unijunction transistor 26 is connected to the conductor 19 through a primary winding 27 of a transformer 28, and the other base electrode of the unijunction transistor 26 is connected to a positive terminal of a D.C. voltage supply.

The transformer 28 has three secondary windings 29, 30 and 31. The secondary winding 31 is connected, through a diode 32, between a gate electrode and a cathode electrode of a thyristor 33 which is an element of a thyristor temperature fall anticipation circuit 34. A diode 35 is connected across the primary winding 31 to eliminate any negative half cycle voltages being induced in the winding 31. An anode of the thyristor 33 is connected to a positive terminal of a D.C. voltage supply through a resistor 36, and is connected to ground through a series combination of a reactor 37 and a capacitor 38. A cathode of the thyristor 33 is connected to ground through a capacitor 39.

The thyristor temperature fall anticipation circuit 34 also includes an integrating circuit having a plurality of resistance and capacitance elements 40 and 41, and the input of the integrating circuit is connected across the capacitor 39 for enabling the same to be charged therefrom. The output of the integrating circuit is applied to a capacitor 42 for charging the same and the terminal voltage of the capacitor 42 is then applied to an emitter electrode of a unijunction transistor 43. One base electrode of the transistor 43 is grounded through a primary winding 44 of a transformer 45, and the other base electrode of the transistor 43 is connected to a D.C. voltage supply.

The secondary winding 46 of the transformer 45 is connected to a primary winding 47 of a transformer 48 which is located at the first stage of a sychronous connecting circuit generally designated by a reference numeral 49. The transformer 48 has a secondary winding 50 and the terminals thereof are respectively connected to a gate electrode of a thyristor 51 through a diode 52 and to a cathode of the thyristor 51. A diode 53 is connected across the secondary winding 50 in order to eliminate any negative half cycle voltages induced in the winding 50.

An anode of the thyristor 51 is connected to a D.C. voltage supply through a resistor 54, and a cathode of the thyristor 51 is grounded through a resistor 55. A series combination of a resistance element 56 and a capacitance element 57 is connected in parallel with the resistor 54, and an intermediate connection point 58 is connected to an anode of a thyristor 59. The cathode of thyristor 59 is connected to a conductor 60 which extends from the lower terminal of the secondary winding 50 of the transformer 48 and the cathode of the thyristor 51. The cathode of the thyristor 59 is grounded through a series combination of a resistance element 61 and a capacitance element 62. An intermediate connection point of the resistance element 61 and the capacitance element 62 is connected to an anode of a thyristor 64, the cathode of which is also grounded.

The conductor 60 is connected to a conductor 65 through a collector and an emitter of a switching transistor 66, and the same is connected to an emitter of a unijunction transistor 67 through a resistor 68. An intermediate connection point of the resistor 68 and the transistor 67 is grounded through a capacitor 69.

One base of the unijunction transistor 67 is connected to a D.C. voltage supply, and the other base of the unijunction transistor 67 is grounded through a primary winding 73 of a transformer 74. The transformer 74 has a pair of secondary windings 75 and 76 and the same are respectively connected to the main thyristors 15 and 16 of FIG. 1.

The secondary winding 29 of the transformer 28 is connected to the gate of the thyristor 59 in order to cause it to turn on, while the secondary winding 30 of the transformer 28 is connected to the gate of the thyristor 64 to cause it to turn on.

The transformers 48 and 74 respectively have primary windings 77 and 78 for enabling a starting signal to be applied thereto.

In FIG. 1 the synchronous indicating circuit is generally shown with a reference numeral 79, and includes a pair of transformers 80 and 81 whose respective primary windings 82 and 83 are respectively connected across the A.C. voltage supply 13 and the stator winding 11 of the motor 10. The secondary windings 84 and 85 are respectively connected to Zenner or constant voltage diodes 86 and 87 respectively through diodes 88 and 89.

Seven NPN type transistors 90 to 96 are provided and a D.C. voltage supply 97 is provided for applying proper collector-emitter currents to the transistors 90 to 96.

The anodes of the constant voltage diodes 86 and 87 are connected to a negative terminal of the D.C. voltage supply 97, and the cathodes of the same are respectively connected to the anodes of nonreverse diodes 98 and 99 whose cathodes are grounded through serially connected resistors 100 and 101. An intermediate connection point of the resistors 100 and 101 is connected to a base of the first stage transistor 90. The collector voltage of the transistor 90 is applied to the base of the second stage transistor 91. The collector of the second stage transistor 91 is connected to an intermediate connection point between a variable resistor 102 and a capacitor 103 which are connected in series across the D.C. voltage supply 97.

The series combination of the resistance element 102 and the capacitance element 103 forms a variable timing circuit. The voltage across the capacitor 103 is applied to the base of the third stage transistor 92.

The three transistors 93, 94 and 95 are connected in series so as to construct an AND gate, and the collector voltage of the third stage transistor 92 is applied to the base of transistor 93. A voltage is applied to the base of the transistor 94 from the cathode of the constant voltage diode 86 through a D.C. current blocking diode 104. A voltage is applied to the base of the transistor 95 from the cathode of the constant voltage diode 87 through a D.C. current blocking diode 105.

The output of the AND gate of the series combination of the transistors 93, 94 and 95 is taken from the collector of the transistor 95 and is then applied to the base of the final stage transistor 96. The output of the transistor 96 is taken from the collector thereof and then applied through conductors 106 and 107 to the base and emitter of the transistor 66 of FIG. 2.

In operation, in order to start the motor 10 a high frequency starting signal is applied to the primary windings 77 and 78 of the respective transformers 48 and 74. The output from the secondary winding 50 of the transformer 48 is then applied to the gate of the thyristor 51 to thereby cause it to turn on. The turn-on state of the thyristor 51 will continue until a gating signal is applied from the secondary winding 29 of the transformer 28 to the gate of the thyristor 59. Meanwhile, the starting signal applied to the primary winding 78 of the transformer 74 will cause the main thyristors 15 and 16 in the thyristor switching device 14 to turn on, and accordingly the full voltage from the A.C. voltage supply 13 will be applied to the stator winding 11 of the motor 10 to thereby make the motor 10 start.

Under such conditions, the voltages across the thyristor switching device 14 will be completely synchronized. Thus, the transistor 90 will turn on when the voltages of the windings 84 and 85 simultaneously become positive and the second stage transistor 91 will turn off. The terminal voltage of the capacitor 103 will increase according to the RC time constant of the resistance element 102 and the capacitance element 103 to thereby turn on the third stage transistor 92 after a predetermined time delay. As such, the transistor 93 will change its state from "on" to "off," and the AND gate which includes the series combination of transistors 93, 94 and 95 will open. To this end, the last stage transistor 96 will generate an output from the collector thereof to thereby turn on the switching transistor 66.

In this manner, the transistor 66 will connect the line 65, so that a D.C. voltage is applied to the emitter of the unijunction transistor 67 until the thyristor 51 is turned off. As is well known, the circuit including the transistor 67, the capacitor 69 and the primary coil 73 of the transformer 74 will provide a high frequency oscillation, and will continue to hold the on-state of the thyristor 15 and 16 even if the starting signals have been removed from transformer windings 77 and 78.

The motor current which is derived from the current transformer 17 is applied to the thyristor temperature rise anticipation circuit 22 to thereby increase the terminal voltage across the capacitor 25 according to a time constant defined by the integrating circuit which includes the resistance element 23 and the capacitance element 24. Now, if the starting rush current exceeds a predetermined value which is defined by a threshold level of the unijunction transistor 26, then the circuit which includes the transistor 26, the capacitor 25 and the primary winding 27 of the transformer 28 will cause a high frequency oscillation so that output signals will be generated from the secondary windings 29, 30, and 31. It can be understood that the temperature of the thyristors 15 and 16 in the static switching device 14 will have reached an upper limit when an excitation has been applied to the transformer 28.

Under such conditions, an output signal from the winding 29 is applied to the gate of the thyristor 59 to thereby turn it on. To this end, the electric charges on the capacitor 57 will be discharged through the thyristor 59 to thereby negatively bias the thyristor 51 and thereby turn it off. Also, the output signal from the winding 30 will be applied to the gate of the thyristor 64 to make it turn on. Thus, the voltage level of the line 60 will fall rapidly to the ground potential. The resistors 56 and 61 serve to reduce the current flowing through the thyristors 59 and 64 to an amplitude which is less than the holding current thereof, and accordingly the thyristors 59 and 64 will be naturally turned off.

In this way, the emitter of the unijunction transistor 67 will be deenergized and the turn-on signal will be removed from the gates of the main thyristors 15 and 16. Thus, the static switch 14 will be turned off.

Meanwhile, the output signal from the winding 31 of the transformer 28 will cause the thyristor 33 to turn on. In this case, the electrical charges on the capacitor 38 will be transferred momentarily to the capacitor 39 by the oscillation circuit which includes the capacitors 38 and 39 and the reactor 37. Now, when the capacitor 39 is charged, the thyristor 31 will be naturally turned off.

It should be understood that the charges of the capacitor 39 are gradually transferred to the capacitor 42 through the integrating circuit which includes the resistance element 40 and the capacitance element 41 in the thyristor temperature fall anticipation circuit 34. Now, when the terminal voltage of the capacitor 42 exceeds the threshold level of the unijunction transistor 43, then the oscillating circuit which serially includes the capacitor 42 and the primary winding 44 of transformer 45 will cause a high frequency oscillation to occur. It can be understood that the aforesaid oscillation can occur at a time when the temperature of the main thyristors fall to a value substantially equal to or less than a predetermined safety value.

When the stator winding 11 of the induction motor 10 is disconnected from the A.C. voltage supply 13, a voltage may be induced in the stator winding 11 for several hundred m.sec. due to a residual magnetism remaining in the rotor core. As a result thereof, if the static switch 14 is turned on without any consideration of synchronization, then the static switch may close when the voltages there-across are in a reverse phase. This will cause an extremely large current to rush into the stator winding 11 of the motor 10 and thereby generate an abnormally high voltage which could break down the insulation of the motor circuit. It is thus required that sychronization be assured before the turn-on of the static switch 14.

The sychronization between the voltages across the static switch 14 according to the present invention is detected, as described hereinbelow by the synchronous indicating circuit 79.

Assuming that the voltage which appears on the secondary winding 84 of the transformer 80 has become positive before the voltage which appears on the secondary winding 85 of transformer 83, then the first stage transistor 90 will turn on to thereby turn off the second stage transistor 91. In accordance therewith, the timing circuit which includes the resistor 102 and the capacitor 103 will begin to operate. The third stage transistor 92 will still be turned off, and the transistor 93 of the AND gate will be turned on. The transistor 94 of the AND gate will be turned on by the positive half cycle of the A.C. voltage supply.

The induced voltage of the stator winding 11 will soon become positive to thereby turn on the transistor 95 of the AND gate. If the time when the induced voltage of the stator winding 11 has become positive is reached before the turn-on of the transistor 92, which can be turned on by the predetermined voltage charged on the capacitor 103, then the transistors 93, 94 and 95 in the AND gate will be able to be turned on to thereby turn off the final stage transistor 96. The collector voltage of the transistor 96 will then change rapidly from the ground voltage level to the positive voltage level of the D.C. voltage supply 97.

In this way, the transistor 66 will become turned on to connect the line 60 to the line 65. The circuit including the unijunction transistor 67, the capacitor 69 and the primary winding 73 of transistor 74 will again oscillate with a high frequency so as to cause the static switch 14 to turn on. The motor 10 is then synchronously connected to the A.C. voltage supply 13.

It can be seen that the serially included transistors 93, 94 and 95 of the AND gate will be turned off during a negative half cycle of the A.C. voltage supply 13. However, since one of the thyristors, which turns on during the negative half cycle has already been turned on, the turn-off of the static switch 14 will not occur, and as soon as the next positive half cycle begins, the AND gate which includes the transistors 93, 94 and 95 will be closed to thereby turn off the transistor 96 such that the turn-on state of the static switch 14 will be maintained.

It should be understood that the aforesaid operation is intermittently repeated during the time when an excess starting current may be present.

When the motor speed has nearly reached the rated speed and the motor current has thereby settled to the rated amplitude, then the repeated cut-off of the motor operation by the thyristor temperature rise and fall anticipation circuits 22 and 34 will no longer occur. Under such conditions, the conductor 60 will be continuously energized from the D.C. voltage supply through the thyristor 51 to thereby cause the static switch 14 to continuously turn on. It can be readily understood that the motor 10 can be deenergized by cutting off the D.C. voltage supply whose voltage is applied to the thyristor 51, the unijunction transistor 67 and so on.

From the above, in accordance with the teachings of the present invention, it can be easily understood that the static switch 14 is intermittently turned off during the starting of the motor so that any burn-out of the thyristors 15 and 16 of the static switch 14 can be avoided. With the intermittent cut-off of the static switch of this invention, it is now possible to use the substantially full rating of the thyristors 15 and 16 under the control of the thyristor temperature rise anticipation circuit 22. Furthermore, with the use of the thyristor temperature fall anticipation circuit 34 of the present invention, it is now possible to reclose the static switch 14 at an appropriate time without waste of the cooling time of the thyristors 15 and 16. In addition, with the use of the synchronous indicating circuit and the synchronous connection circuit 49 of the present invention, the synchronized connection between the motor 10 and the A.C. voltage supply 13 thereof can be effectively achieved during the repeated turn-off and turn-on of the static switch 14 without a reverse phase connection. In this way, a static switch is realized which is economical and of a small size.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A starting control for an A.C. electric motor device comprising:
   an A.C. electric motor device;
   an A.C. voltage supply for supplying voltage to said motor;
   a thyristor switching device having thyristors therein and being connected between said motor device and said A.C. voltage supply;
   a thyristor temperature rise anticipation circuit for intermittently turning off said thyristor switching device by anticipating a predetermined temperature rise of the thyristors provided in the thyristor switching device in response to an excessive motor current during a starting of said motor;
   a thyristor temperature fall anticipation circuit for intermittently turning on said thyristor switching device during the starting of said motor by anticipating a predetermined temperature fall of the thyristors provided in the thyristor switching device in response to the turn-off of the thyristor switching device;

a synchronous indicating circuit for detecting synchronization between voltages across the said thyristor switching device while the same is turned off, and, a synchronized connecting circuit for enabling said thyristor switching device to turn on in accordance with said thyristor temperature fall anticipation circuit.

2. A starting control for an A.C. electric motor device according to claim 1, wherein said thyristor temperature rise anticipation circuit comprises an integrating circuit which includes resistance and capacitance elements therein; and, said thyristor temperature fall anticipation circuit comprises an integrating circuit which includes resistance and capacitance elements therein.

3. A starting control for an A.C. electric motor device according to claim 1, wherein said synchronized connecting circuit comprises:

a D.C. voltage supply;

first circuit means being energized from said D.C. voltage supply in response to an output from said thyristor temperature fall anticipation circuit;

second circuit means for energizing the gate of the thyristors of said thyristor switch; and, a switching transistor device for connecting said first and second circuit means in accordance with an output from said synchronous indicating circuit.

4. A starting control for an A.C. electric motor device according to claim 1, wherein said synchronous indicating circuit includes three serially connected transistors, one of said transistors being turned on when one of said voltages across said thyristor switching device is of a predetermined polarity prior to the others and being held in its turn-on state for a predetermined time interval, the other transistors being respectively turned on when said voltages across said thyristor switching device are respectively in a predetermined polarity.

* * * * *